United States Patent Office 3,297,430
Patented Jan. 10, 1967

3,297,430
METHOD FOR PRODUCING LEDEBURITIC STEEL SHOWING A GLOBULAR SOLIDIFIED STRUCTURE
Franz Sperner, Grossauheim, Germany, assignor to Rochling'sche Eisen- und Stahlwerke G.m.b.H., Volklingen, and W. C. Heraeus G.m.b.H., Hanau, Germany
No Drawing. Filed Dec. 24, 1963, Ser. No. 333,169
Claims priority, application Germany, Jan. 4, 1963, R 34,173
1 Claim. (Cl. 75—12)

It is a well-known fact that ledeburitic steel obtained in a molten condition in an arc or an induction furnace into which air is admitted, has a marked tendency when cast to show a dendritic solidified structure and consequently substantial segregration of the ledeburitic carbide appears in the ingot core when the ingot thickness increases and this is particularly objectionable in the case of tool steel because it reduces the life of many tools produced therewith. Attempts have been made hitherto to obtain through suitable addition a globular solidification without any larger segregation of carbide in the ingot core.

It has also been proposed to subject ledeburitic steel intended to resist very high stresses, to a renewed melting in an arc furnace in vacuo, with a view to improving the grade of purity of the steel. Thus the segregation of carbide is also reduced in the ingot core, it is true, by the cooling action of the water-cooled copper chills generally used in vacuum arc furnaces. The ledeburitric network is however then not globular, but clearly dendritic. In a shaped steel there appear then, more particularly along the edges, rough primary carbide grains, which have a detrimental action on the life of many tools made of ledeburitic steel. Furthermore, tools made originally of steel solidified with a dendritic structure have a tendency when tempered, to be more deformed than after a globular solidification which leads often to the necessity of an important machining.

My invention has for its object to associate the advantages of melting in vacuo, to wit the obtention of a higher grade of purity together with a reduction of the segregation in the core, with the production of a globular structure through incorporation of additional material. Since it is impossible to execute otherwise than with considerable difficulties a uniform injection of metal additions during the second melting in the vacuum arc furnace in order to obtain a globular structure, my improved method consists in proceeding with the renewed melting of ledeburitic steel in an atmosphere of nitrogen or of a gasiform nitrogen-containing mixture in a vacuum arc furnace under a pressure ranging between 5 and 760 mm. of mercury. This produces a globular structure for the ledeburitic network of the steel obtained in vacuo, the primary carbide grains of which steel are much finer than that of the steel subjected to a remelting in vacuo while their grade of purity is improved approximately to the same extent as in said steel produced in vacuo.

What I claim is:
A method of producing a ledeburitic steel solidified with a globular structure consisting of melting a ledeburitic steel in the presence of air, cooling said melted steel to solidify same, remelting said solidified steel in the presence of an electric arc in an inert atmosphere comprising nitrogen at an absolute pressure between approximately 5 and 760 mm. of mercury.

References Cited by the Examiner
UNITED STATES PATENTS
3,248,210   4/1966   De Fries et al. _____ 75—59

HYLAND BIZOT, Primary Examiner.
H. W. TARRING, Assistant Examiner.